United States Patent
Huf et al.

(10) Patent No.: US 11,472,364 B2
(45) Date of Patent: Oct. 18, 2022

(54) VEHICLE SEAT

(71) Applicant: Bayerische Motoren Werke Aktiengesellschaft, Munich (DE)

(72) Inventors: Andreas Huf, Neusaess (DE); Sylvia Kleindl, Munich (DE); Fabian Koehler, Valley (DE); Robert Martin, Munich (DE); Martin Unger, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/283,838

(22) PCT Filed: Aug. 28, 2019

(86) PCT No.: PCT/EP2019/072995
§ 371 (c)(1),
(2) Date: Apr. 8, 2021

(87) PCT Pub. No.: WO2020/074171
PCT Pub. Date: Apr. 16, 2020

(65) Prior Publication Data
US 2021/0380063 A1   Dec. 9, 2021

(30) Foreign Application Priority Data
Oct. 9, 2018   (DE) ................ 10 2018 124 926.8

(51) Int. Cl.
*B60R 21/207*   (2006.01)
(52) U.S. Cl.
CPC .................. *B60R 21/207* (2013.01)
(58) Field of Classification Search
None
See application file for complete search history.

(56) References Cited

U.S. PATENT DOCUMENTS 5,782,529 A * 7/1998 Miller, III ............. B60R 21/207
280/730.1
6,273,810 B1   8/2001 Rhodes, Jr. et al.
(Continued)

FOREIGN PATENT DOCUMENTS

CN   1891530 A   1/2007
CN   102317111 A   1/2012
(Continued)

OTHER PUBLICATIONS

International Search Report (PCT/ISA/210) issued in PCT Application No. PCT/EP2019/072995 dated Nov. 21, 2019 with English translation (five (5) pages).

(Continued)

*Primary Examiner* — Faye M Fleming
(74) *Attorney, Agent, or Firm* — Crowell & Moring LLP

(57) ABSTRACT

A vehicle seat has a lower seat part and a seat backrest. The seat backrest has a backrest structure, a central backrest section which has at least one backrest cushion and a backrest cover, and a left and a right backrest side wall. The seat backrest is provided with at least one expansion element which has at least one cavity that is enclosed by a membrane and can be filled with an expansion fluid from a fluid source. At least one respective fillable cavity of the at least one expansion element is integrated into the backrest cushion of the central backrest section or is provided between the backrest structure and the backrest cushion of the central backrest section to the left and the right of the backrest longitudinal central plane at a lateral distance thereto.

9 Claims, 1 Drawing Sheet

(56) References Cited

U.S. PATENT DOCUMENTS

| | | | |
|---|---|---|---|
| 10,800,370 B2 * | 10/2020 | Jaradi | ................... B60R 21/233 |
| 2004/0174056 A1 | 9/2004 | Gryp et al. | |
| 2007/0018439 A1 | 1/2007 | Sunabashiri | |
| 2012/0032478 A1 | 2/2012 | Friderich et al. | |
| 2012/0259181 A1 | 10/2012 | Fujita et al. | |
| 2014/0001799 A1 | 1/2014 | Kalisz et al. | |
| 2018/0126941 A1 | 5/2018 | Faruque et al. | |

FOREIGN PATENT DOCUMENTS

| | | | |
|---|---|---|---|
| CN | 103507744 A | | 1/2014 |
| CN | 104842838 A | | 8/2015 |
| CN | 108068745 A | | 5/2018 |
| DE | 199 38 689 A1 | | 2/2001 |
| DE | 10 2004 010 877 A1 | | 9/2004 |
| DE | 10 2008 029 339 A1 | | 1/2009 |
| DE | 10 2011 122 416 A1 | | 9/2012 |
| DE | 10 2011 109 649 A1 | | 2/2013 |
| DE | 10 2016 216 329 A1 | | 3/2018 |
| EP | 1 077 154 A2 | | 2/2001 |
| EP | 1077154 A2 * | 2/2001 | ........... B60N 2/0276 |
| JP | H06284942 A * | 10/1994 | |
| JP | 2006198306 A * | 8/2006 | |
| KR | 19980057339 A * | 9/1998 | |

OTHER PUBLICATIONS

German-language Written Opinion (PCT/ISA/237) issued in PCT Application No. PCT/EP2019/072995 dated Nov. 21, 2019 (six (6) pages).

German-language Search Report issued in German Application No. 10 2018 124 926.8 dated Aug. 13, 2019 with partial English translation (11 pages).

English translation of Chinese-language Office Action issued in Chinese Application No. 201980065358.3 dated Jul. 5, 2022 (seven (7) pages).

* cited by examiner

VEHICLE SEAT

BACKGROUND AND SUMMARY OF THE INVENTION

The invention relates to a vehicle seat. The invention furthermore relates to a motor vehicle with at least one such vehicle seat.

Some vehicles have vehicle seats in which the occupant sits counter to the direction of travel. The use of such seats will probably increase in future in the case of autonomously driving vehicles. These vehicle seats which are directed counter to the direction of travel have different requirements in respect of crash protection in the event of a collision than a vehicle seat facing conventionally in the direction of travel.

If a passenger is sitting counter to the direction of travel, the passenger's body is pressed into the seat backrest of the vehicle seat in the event of a head-on collision. However, the seat backrest is fairly softly upholstered for comfort reasons, and therefore, in the event of a correspondingly hard, collision-induced impact, the passenger is pressed through the cushion onto the seat structure, for example onto the seat shell. Without adversely affecting the seat comfort during normal operation, the body of a passenger sitting on a vehicle seat directed counter to the direction of travel must therefore be prevented, in the event of a head-on collision, from penetrating through the backrest upholstery onto the seat structure. This is furthermore also applicable to vehicle seats directed in the direction of travel in the event of a rear-end impact; however, the collision energy in the event of a head-on impact is generally significantly greater than in the event of a rear-end impact.

DE 10 2011 109 649 A1 discloses a vehicle seat which, inter alia, in the region of the seat upholstery or backrest upholstery, preferably in the backrest upholstery, or in the region of the seat structure or backrest structure, is provided with at least one expansion body, for example an airbag, which can be filled with a fluid and is bounded by an elastic membrane. This expansion body is preferably U-shaped in cross section, and therefore, in the expanded state, it partially surrounds the body of a passenger sitting on the seat. It can have one or more fillable cavities. The provision of this expansion body is intended to damp the forces acting on the body of a passenger sitting on the seat in the event of a collision of the seat backrest with the passenger's body, as occurs, for example, in a rear-end impact or in the case of a forwardly sliding load in a utility vehicle.

In the event of a head-on collision in which significantly greater accelerations occur and therefore significantly higher forces act on the body, this configuration of a vehicle seat is, however, less suitable since, even when the expansion body is expanded, its elasticity, which is required for absorbing the body, does not prevent the spinal column from penetrating through to the backrest structure. In the case of such a known vehicle seat with an expansion body which is configured for a rear-end impact, the expansion body in the event of a head-on collision would have to be expanded to such a great extent that the passenger would be kept far away from the backrest—and therefore also from the headrest, which would cause hyperextension of the cervical spine. This vehicle seat configuration known from this prior art is therefore not a suitable solution for preventing the spinal column from penetrating through to the backrest structure in the event of a head-on collision.

It is therefore the object of the present invention to design a vehicle seat of the type in question in such a manner that, without adversely affecting the seat comfort during normal operation, the body of a passenger sitting on a vehicle seat directed counter to the direction of travel does not penetrate through the backrest upholstery to the seat structure in the event of a head-on collision.

This object is achieved by a vehicle seat with a lower seat part and a seat backrest. The seat backrest has a backrest structure, a backrest center section with at least one backrest cushion and with a backrest cover, and a left and a right backrest side member, wherein the seat backrest is provided with at least one expansion body which has at least one cavity which is surrounded by a membrane and can be filled with an expansion fluid from a fluid source. In this vehicle seat, it is provided that in each case at least one fillable cavity of the at least one expansion body is integrated in the backrest cushion of the backrest center section, or is provided between the backrest structure and the backrest cushion of the backrest center section, on the left and right of the backrest longitudinal center plane, in a manner spaced apart laterally therefrom.

The term "backrest side members" should be understood here not only as meaning lateral parts of the seat backrest formed separately from the backrest center section, but also the lateral sections of side-member-like profile of a single-part backrest cushion in which the backrest section is formed integrally with these backrest side member sections.

In the event of a collision, the cavities of the at least one expansion body are abruptly filled with the expansion fluid on the left and right of the backrest longitudinal center plane, as a result of which the region of the backrest cushion lying between the respective cavity and the backrest cover is compressed and thereby hardened. By contrast, the part of the backrest cushion in the region of the backrest longitudinal center plane between the cavities remains soft. If the back of the passenger sitting on the vehicle seat now strikes against the seat backrest, the passenger's spinal column with the spinous processes can plunge into the softer central part of the backrest cushion while the ribs and possibly the shoulders of the passenger on the left and right of the spinal column strike against the left and right compressed, hardened region of the backrest cushion and are cushioned by the pressurized expansion body, with the impact against the seat backrest being effectively damped. Owing to the fact that the backrest cushion is compressed in the lateral regions, the passenger's back can only plunge slightly, if at all, here into the backrest cushion and is kept by the expansion body, or by its filled cavity, at a distance from the backrest structure, and therefore the spinal column and in particular the spinous processes which penetrate into the softer central part of the backrest cushion do not enter into contact with the backrest structure. It is of particular advantage here if the cavities arranged in pairs on the left and right of the backrest longitudinal center plane can be filled synchronously, and therefore a torsional movement of the passenger's upper body is avoided.

Further preferred and advantageous refinement features of the vehicle seat according to the invention are the subject matter of the dependent claims.

The expansion body is preferably formed by an airbag unit. The expansion body in the form of an airbag is flexurally soft in the folded state and is of such a small size that it can be fitted into the seat backrest without restrictions on comfort or design freedom having to be accepted.

In a particularly advantageous embodiment of the vehicle seat according to the invention, the airbag unit has at least in each case one inflatable tubular body or tubular body section which is arranged on the left and right of the backrest longitudinal center plane in a manner spaced apart laterally therefrom and which determines the respective cavity.

It is particularly advantageous here if the tubular bodies which are arranged in pairs on the left and right of the backrest longitudinal center plane can be inflated synchronously.

For this purpose, the two tubular bodies of a paired tubular body arrangement are preferably assigned a common gas generator which is connected to the tubular bodies via gas supply lines of identical length. This ensures that the two tubular bodies are inflated at the same time with the same filling volume, thus resulting in a symmetrical support of the passenger.

Alternatively, each of the two tubular bodies of a paired tubular body arrangement is assigned a separate gas generator, and a control device is provided which has the effect that the gas generators of the paired tubular body arrangement are triggered synchronously. The tubular bodies can also thereby be inflated at the same time and with the same intensity.

A particularly advantageous development of the vehicle seat according to the invention, which can be combined with other embodiments, is distinguished in that the seat backrest is provided with an active headrest. In the event of a collision, such an active headrest already moves its front surface, which meets the passenger's head, forward prior to the meeting thereof and comes to meet the rearwardly moving head. As a result, in most cases, hyperextension of the cervical column can be promptly prevented.

The invention is also directed toward a motor vehicle, in particular a passenger motor vehicle, which is provided with at least one vehicle seat according to the invention.

It is of particular advantage here if the motor vehicle has a plurality of vehicle seats, of which at least one vehicle seat is directed counter to the direction of travel, and if the at least one vehicle seat directed counter to the direction of travel is designed according to the invention.

Preferred exemplary embodiments of the invention with additional refinement details and further advantages are described and explained in more detail below with reference to the attached drawings.

DETAILED DESCRIPTION OF THE DRAWINGS

Figure 1:
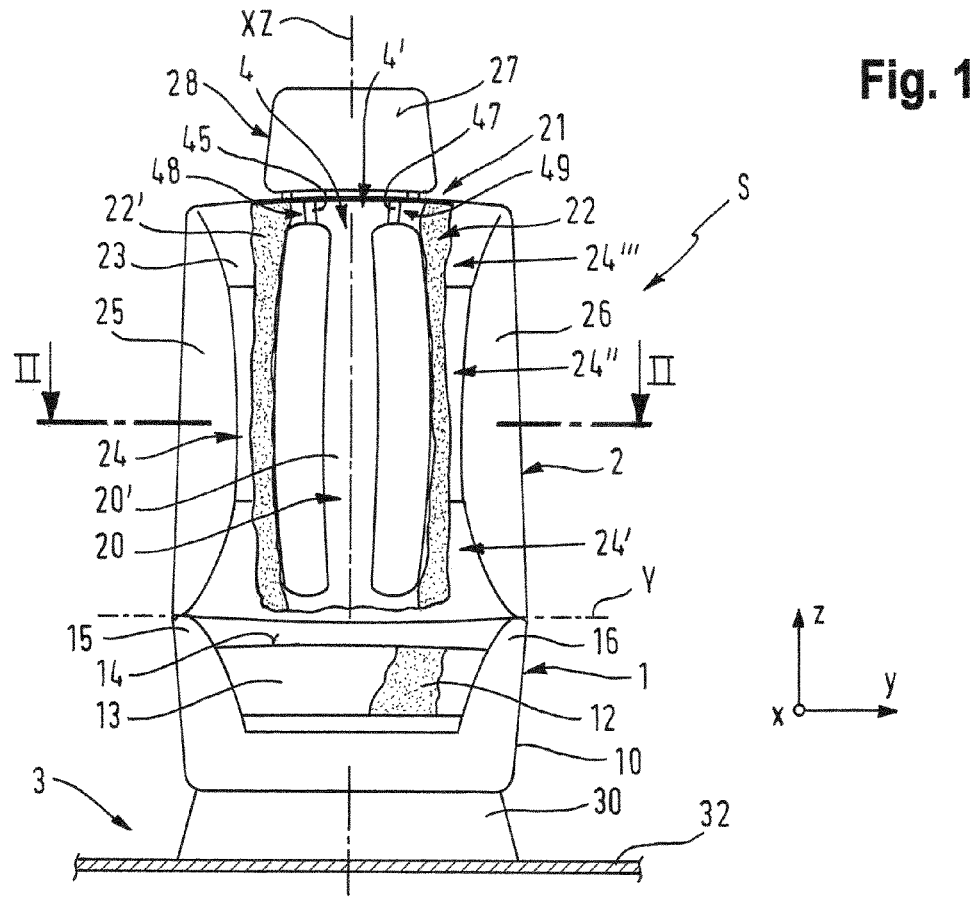
FIG. 1 is a view, looking in the direction of travel, of a vehicle seat installed in a vehicle counter to the direction of travel.

FIG. 1 shows a vehicle seat S which has a lower seat part 1 to which a seat backrest 2 is attached in a conventional manner by means of a joint so as to be pivotable about an axis of inclination Y. The seat is fastened in a conventional manner on the interior floor 32 of a vehicle 3, merely indicated symbolically in FIG. 1, by means of a seat console 30 so as to be longitudinally displaceable and adjustable.

The lower seat part 1 has a seat base structure 10 which is connected to the seat console 30 and on which a seat cushion 12 covered by a seat cover 13 is arranged. On its upper side, the seat cover 13 forms a seat surface 14 which is bounded on the left and right by a respective seat side member 15, 16.

The seat backrest 2 has a backrest structure 20 with a backrest shell 20' which is connected pivotably to the seat base structure 10 via the joint. A backrest cushion 22 covered by a backrest cover 23 is arranged in a backrest center section 21 on the backrest structure 20.

The backrest cushion 22 is substantially composed of a polymer foam body 22', or comprises at least one such body. On its front side, the backrest cover 23 forms a backrest surface 24 on which the back of a passenger sitting on the seat comes to bear. The lower part of the backrest surface 24 forms a lumbar region 24' in which the passenger's loins come to bear, the central part of the backrest surface 24 forms a chest region 24" in which the rear regions of the passenger's ribs come to bear, and the upper part of the backrest surface forms a shoulder region 24''' in which the passenger's shoulders come to bear. The backrest center section 21 is bounded on the left and right by a respective backrest side member 25, 26. Furthermore, the seat backrest 2 has an active headrest 28 which is designed in a known manner such that its supporting surface 27 facing the passenger's head moves toward the head in the event of a collision.

The seat backrest 2 is provided with an expansion body 4 which, in the example shown, has two cavities 40, 42 which are each surrounded by a membrane 41, 43 and extend over at least part of the height of the seat backrest 2 (in the z direction in the case of an upright seat backrest) on the side of the backrest cushion 22 of the backrest center section 21 that faces the backrest structure 2 on the left and right of the backrest longitudinal center plane XZ at a lateral distance therefrom (in the y direction). In the example shown, the cavities 40, 42 extend from the lumbar region 24' into the shoulder region 24'''. Alternatively, for each or only some of the regions 24', 24", 24''' of the backrest surface 24, an independent pair of cavities can also be provided, the pair being designed in each case in the manner of the cavities 40, 42 described in more detail below, or the cavities 40, 42 can alternatively also extend only over part of the height of the seat backrest 2. The cavities in width (y direction) in each case lie in one half of the backrest center section 21 and do not reach into the region of the backrest side members 25, 26.

The expansion body 4 shown in the figures is formed by an airbag unit 4' which has a first, left tubular body 44 and a second, right tubular body 46 which is in each case formed by the corresponding membrane 42, 43 and determines the respective cavity 40, 42. The tubular bodies 44, 46 are in each case connected via a gas supply tube 45, 47 to a gas generator (not shown) which forms a fluid source of a fluid suitable for filling the cavities 40, 42, a gas in the example shown here. In this case, the gas supply tubes 45, 47 form gas supply lines 48, 49 for the airbag unit 4'.

Figure 2:
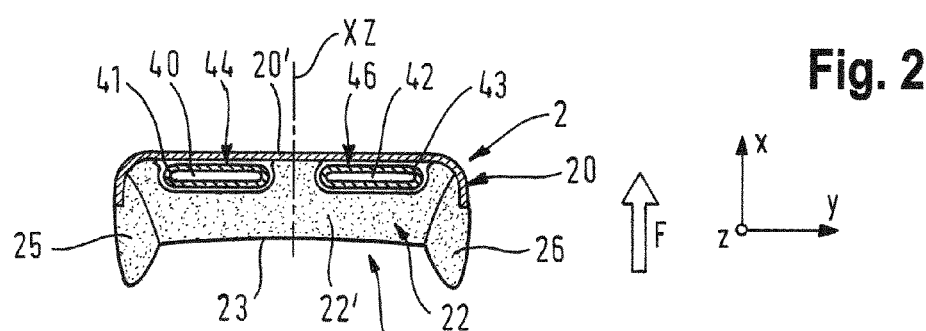
FIG. 2 shows a horizontal section through the seat backrest of the vehicle seat from FIG. 1 along the line II-II in the normal state of the vehicle seat.

FIG. 2 shows, in a horizontal section, how the tubular bodies 44, 46 in the normal state of the vehicle seat S are arranged folded together between the backrest cushion 22 of the backrest center section 21 and the backrest structure 20. This position of the tubular bodies 44, 46 does not impair the elastic, flexible properties of the backrest cushion 22 that are desired during normal operation, and therefore the seat comfort is not impaired. Although two separate tubular bodies 44, 46 are shown in the drawings, for the purpose of simplifying the installation, these tubular bodies can be parts of a tubular body unit in which a flat center section connecting the tubular bodies 44, 46 to one another is not designed as a hollow body and consequently cannot be inflated. Such a tubular body unit can also have more than one pair of tubular bodies which are arranged one above another (in the z direction) and can be separately inflated in pairs.

Figure 3:
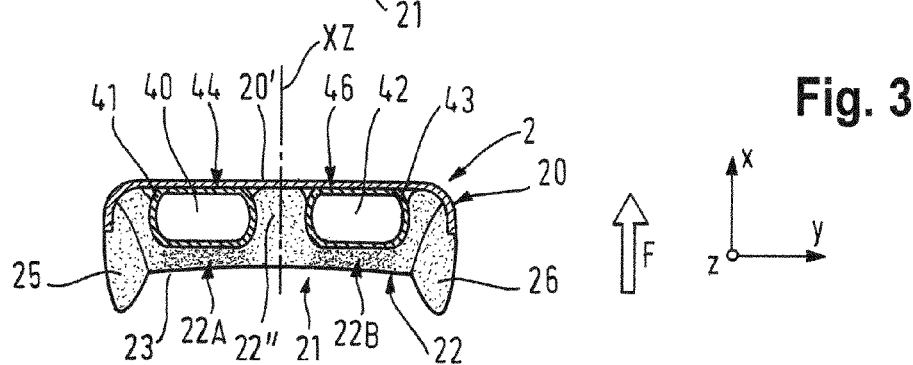
FIG. 3 shows the sectional view of FIG. 2 with an expansion body filled in a collision situation.

FIG. 3 shows, in horizontal section, how the tubular bodies 44, 46 in the event of a collision are expanded, i.e. inflated, as a result of a head-on collision of the vehicle 3. The inflated tubular bodies 44, 46, which are supported against the backrest shell 20' of the backrest structure 20, compress the backrest cushion 22, in particular the at least one polymer foam body 22' thereof, against the backrest cover 23 in the regions of the backrest cushion 22 denoted by 22A and 22B on the left and right of the backrest longitudinal center plane XZ. This compression compresses the polymer foam body 22' in these regions and takes away most of its elasticity here, i.e. makes it harder, as is illustrated symbolically by the greater density of the dots in FIG. 3.

If the back of the passenger now strikes against the backrest surface 24, it cannot penetrate, or can only penetrate insignificantly, into the backrest cushion 22 in these compressed regions of the backrest cushion 22 on the left and right of the spinal column and is substantially cushioned by the internal pressure in the tubular bodies 44, 46 of the airbag unit 4' and supported by said tubular bodies against the backrest structure 20. By contrast, the spinal column with its spinous processes can penetrate into the central, uncompressed region 22" of the backrest cushion 22 along the backrest longitudinal center plane XZ and is gently cushioned there without penetrating through to the backrest structure 20.

Although the figures illustrate an embodiment of the vehicle seat S according to the invention in which the tubular bodies 44, 46 are provided with the fillable cavities 40, 42 between the backrest structure 20 and the backrest cushion 22 of the backrest center section 21, it is nevertheless alternatively possible and covered by the invention to integrate the tubular bodies in the backrest cushion 22 of the backrest center section 21. In the event of a collision-induced inflation of the tubular bodies 44, 46, the backrest cushion 22 is then compressed in front of and behind the respective tubular bodies 44, 46, i.e. against the backrest cover 23 and against the backrest structure 22.

The invention is not restricted to the above exemplary embodiment which serves merely for generally explaining the core concept of the invention. On the contrary, within the scope of protection, the device according to the invention can also assume other embodiments than those described above. The device here can in particular have features which constitute a combination of the respective individual features of the claims.

Reference signs in the claims, the description and the drawings serve merely for better understanding of the invention and are not intended to restrict the scope of protection.

LIST OF REFERENCE SIGNS

1 Lower seat part
2 Seat backrest
3 Vehicle
4 Expansion body
4' Airbag unit
10 Seat base structure
12 Seat cushion
13 Seat cover
14 Seat surface
15 Seat side member
16 Seat side member
20 Backrest structure
20' Backrest shell
21 Backrest center section
22 Backrest cushion
22' Polymer foam body
22" Central, uncompressed region of the backrest cushion
22A Region of the backrest cushion
22B Region of the backrest cushion
23 Backrest cover
24 Backrest surface
24' Lumbar region
24" Chest region
24''' Shoulder region
25 Backrest side member
26 Backrest side member
27 Supporting surface
28 Headrest
30 Seat console
32 Interior floor
40 Cavity
41 Membrane
42 Cavity
43 Membrane
44 Tubular body
46 Tubular body
S Vehicle seat
XZ Backrest longitudinal center plane
Y Axis of inclination

What is claimed is:

1. A vehicle seat with a lower seat part, comprising:
   a seat backrest having a backrest structure, a backrest center section with at least one backrest cushion and a backrest cover, and a left and a right backrest side member;
   at least one expansion body in the seat backrest, which has at least one cavity surrounded by a membrane and fillable with an expansion fluid from a fluid source, wherein
   in each case, at least one fillable cavity of the at least one expansion body is integrated in the backrest cushion of the backrest center section, or is provided between the backrest structure and the backrest cushion of the backrest center section, on each side left and right of a backrest longitudinal center plane, in a manner spaced apart laterally from the backrest longitudinal center plane and with a region of the backrest cushion lying between the cavity and the backrest cover, whereby expansion of the expansion body compresses the region.

2. The vehicle seat according to claim 1, wherein the expansion body is formed by an airbag unit.

3. The vehicle seat according to claim 2, wherein the airbag unit has at least, in each case, one inflatable tubular body or tubular body section which is arranged on the left and right of the backrest longitudinal center plane in a manner spaced apart therefrom and which determines the respective cavity.

4. The vehicle seat according to claim 3, wherein the tubular bodies arranged in pairs on the left and right of the backrest longitudinal center plane are inflatable synchronously.

5. The vehicle seat according to claim 4, wherein
the tubular bodies of a paired tubular body arrangement are assigned a common gas generator which is connected to the tubular bodies via gas supply lines of identical length.

6. The vehicle seat according to claim 4, wherein
each tubular body of a paired tubular body arrangement is assigned a separate gas generator, and
a control device is provided so that the gas generators of the paired tubular body arrangement are triggered synchronously.

7. The vehicle seat according to claim 1, wherein
the seat backrest has an active headrest.

8. A motor vehicle comprising at least one vehicle seat according to claim 1.

9. The motor vehicle according to claim 8, wherein
the motor vehicle has a plurality of vehicle seats, of which the at least one vehicle seat is directed counter to a direction of travel.

* * * * *